UNITED STATES PATENT OFFICE.

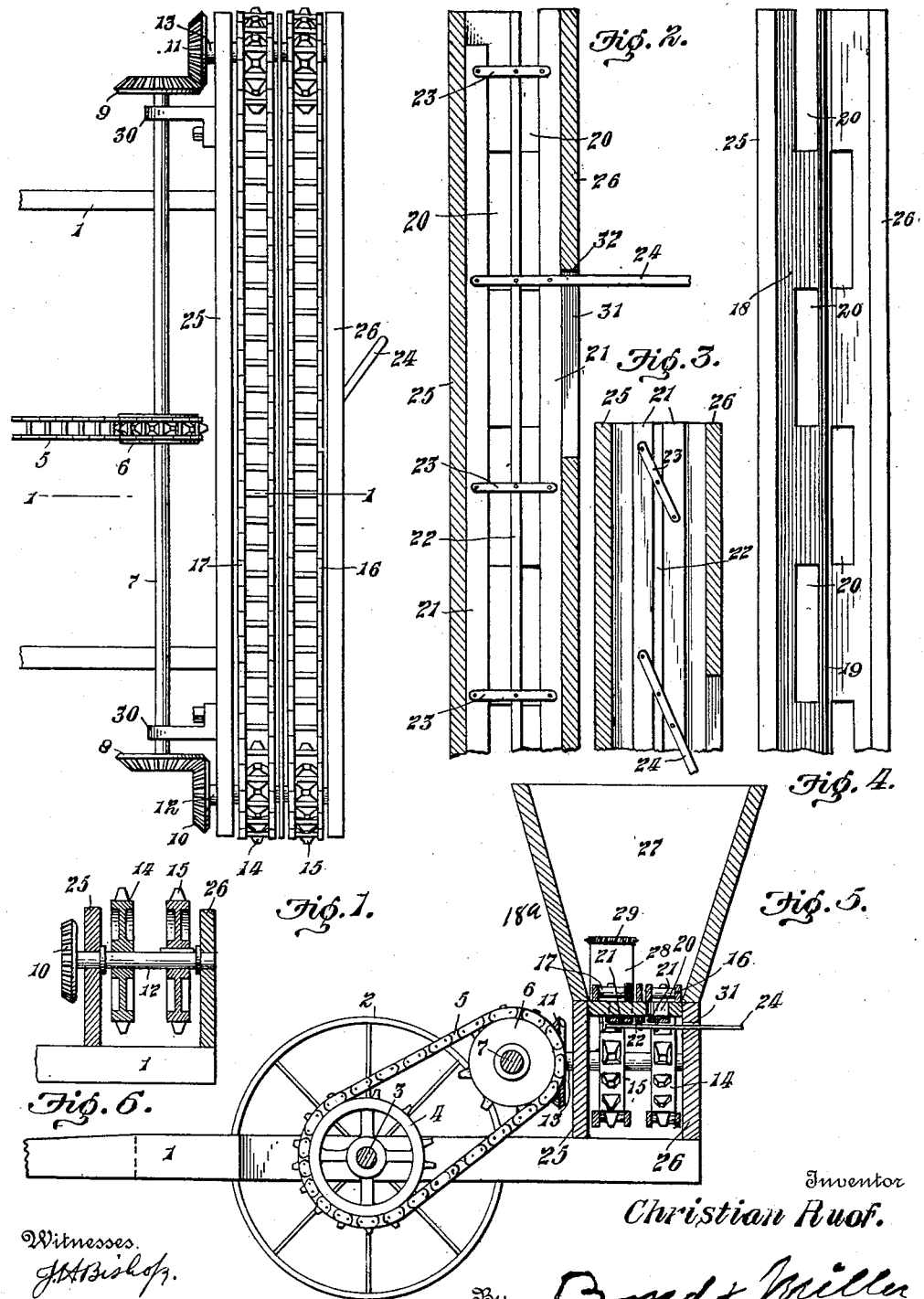

CHRISTIAN RUOF, OF ZOAR, OHIO.

FERTILIZER-DISTRIBUTER.

968,267.  Specification of Letters Patent.  Patented Aug. 23, 1910.

Application filed May 31, 1910. Serial No. 564,041.

*To all whom it may concern:*

Be it known that I, CHRISTIAN RUOF, a citizen of the United States, residing at Zoar, in the county of Tuscarawas and State of Ohio, have invented certain new and useful Improvements in Fertilizer-Distributers, of which the following is a specification.

This invention relates to fertilizer distributers and has for its object to improve the construction and facilitate and equalize the discharge of material.

A further object of the invention is to so arrange the parts having special reference to such parts as come in direct contact with the material designed to be distributed, to agitate such material and to prevent clogging or choking.

With these and other objects in view it will be apparent to those skilled in the art that the invention consists in the novel features of construction as hereinafter more fully described and claimed.

In the accompanying drawing, forming a part of this specification and in which corresponding parts are designated by like numerals is illustrated the preferred form of the embodiment of the invention capable of carrying the same into practical operation.

In the accompanying drawing, Figure 1 is a top plan view with the hopper removed. Fig. 2 is a bottom plan view showing portions of the regulating plates also showing the different parts having special reference to said regulating plates properly connected and the plates open. Fig. 3 is a bottom view showing portions of the regulating plates in a closed position. Fig. 4 is a top plan view showing a portion of the combined distributing chain carrying and guide plate. Fig. 5 is a transverse section taken on line 1—1, Fig. 1, except Fig. 1 does not show the hopper nor does it show the traveling wheels and the main axle. Fig. 6 is a sectional view showing one of the end shafts in full lines and a tight and loose sprocket wheel located upon said shaft, also showing the beveled gear wheel properly connected to said shaft.

In the accompanying drawing, 1 represents the frame which is constructed in the usual manner of frames pertaining to seeding machines, but the construction of the frame has no specific reference to the present invention except that a frame must necessarily be employed and is mounted upon traveling or bearing wheels 2, which wheels are mounted upon the axle 3, said wheels being mounted in the usual manner common to seeding machines and other agricultural implements. Upon the axle 3 and about midway between the ends of the machine proper is mounted the sprocket wheel 4 from which sprocket wheel leads the drive chain 5, which drive chain extends around and communicates rotary motion to the sprocket wheel 6, which sprocket wheel is securely mounted upon the shaft 7. At the ends of the shaft 7 are securely mounted the beveled gear wheels 8 and 9, which beveled gear wheels mesh with the beveled gear wheels 10 and 11. The beveled gear wheels 10 and 11 are securely mounted upon the short shafts 12 and 13 upon which shafts 12 and 13 are mounted the sprocket wheels 14 and 15.

For the purpose hereinafter described the sprocket wheels 14 are loosely mounted upon the shafts 12 and 13, and the sprocket wheels 15 securely mounted upon said shafts 12 and 13. Upon the sprocket wheels are located the fertilizer distributing chains 16 and 17, which chains are substantially of the form and kind of ordinary drive chains such as are used upon sprocket wheels. It will be understood that by securely mounting the sprocket wheels 15 upon the shafts 10 and 11 the distributing chains 16 and 17 will be actuated by the fixed sprocket wheels and their upper members move in opposite directions, the sprocket wheels 14 running idle upon the respective shafts. Directly below the upper members of the distributing chains 16 and 17 is located the plate 18, which plate is for the purpose of providing what might be termed a run way for the distributing chains and at the same time forming a guide for said chains.

For the purpose of preventing the adjacent inner edges of the drive chains 16 and 17 from interfering with each other the parting rib 19 is provided which parting rib separates the edges of the chains 16 and 17 from each other as best illustrated in Fig. 5. For the purpose of allowing fertilizing material to pass the plate 18 and find its way to the ground, said plate is provided with a series of openings 20, which openings are spaced from each other longitudinally and transversely or in other words there are two sets of openings, which openings are staggered as illustrated in Fig. 4, and are so staggered for the purpose of forming substantially a continuous opening throughout the entire length of the plate 18, by which arrangement the material designed to be distributed is more evenly distributed, owing to the fact that by providing two rows of openings there is practically no obstruction to the free passage of the material designed to pass or fall through the opening in the plate 18.

For the purpose of regulating the amount of fertilizing material designed to be sown or distributed I provide the movable cut off plates 21, which cut off plates are located just below the plate 18 and are held in proper position in any convenient and well known manner, but owing to the fact that it is immaterial as to how said cut off plates are supported, no means for supporting the same are illustrated. Between the cut off plates 21 is located the fixed bar 22, which bar is fixed in any convenient and well known manner to some stationary part of the frame or other fixed part. To the fixed bar 22 are pivotally attached intermediate their ends the links 23, the ends of said links being pivotally attached to the cut off plates 21.

To the bar 22 is pivoted the lever 24, which lever extends rearward and to which lever is pivotally connected the two cut off plates 21. It will be understood that when the lever 24 is located at substantially right angles to the cut off plates 21, said cut off plates will be moved away from the fixed bar 22, thereby providing open spaces between said bars 21 and the fixed bar 22. When it is desired to cut off the feed or stop the distributing of fertilizing material the lever 24 is brought into the position shown in Fig. 3 and when in said position the cut off bars 21 are brought into close contact with the fixed bar 22, thereby bringing said cut off bars directly beneath the openings 20, thereby cutting off the passage of fertilizing material.

For the purpose of providing means for holding the feed plate 18 and also providing means for properly journaling the shafts 10 and 11, the side members 25 and 26 are provided which are connected to the frame, said side members also constituting a suitable housing for the distributing chains 16 and 17 and the various sprocket wheels and the cut off plates 21. The feed plate 18 also serves the purpose of constituting a bottom for the hopper 18$^a$.

It will be understood that by adjusting the lever 24 or setting it at various angles to the cut off bars 21, said bars will be brought to or from the fixed bar 22, thereby regulating the amount of material to be distributed, the adjustment of said cut off bars adjusts the size of the openings or passages 20 in the plate 18.

It will also be understood that the present invention is not designed to distribute what might be termed common barn yard manure, but has specific reference to the distributing of lime, guano and other fertilizers of like character.

It will be understood that by actuating the distributing chains 16 and 17 in opposite directions, said chains will have a tendency to agitate the material and also prevent the material from being moved bodily in one direction.

For the purpose of preventing the distributing chains from becoming clogged or locked by reason of coarse particles, such as pebbles, or unusually large pieces of lime, the ends of the hopper 27 should be provided with doors 28 which are normally closed by suitable springs, such as 29, but when a large pebble, piece of lime or other obstruction too large to pass through the distributing chains is brought against a door such as 28, the door will be forced outward, the large article passing through the door.

For the purpose of providing suitable bearings for the shaft 7 brackets 30 are provided, which brackets are connected in any suitable and convenient manner to the side member 25 or its equivalent. The side member 26 through which the lever 24 passes must necessarily be provided with a slot 31, said slot being of sufficient length to allow the lever 24 to be swung or turned into position to actuate the cut off plates 21.

For the purpose of providing a stop for the lever 24 the stop flange 32 is provided which is preferably formed by locating the end of the slot 31 in alinement with the pivotal point of said lever 24 upon the fixed bar 22.

Having fully described my invention what I claim as new and desire to secure by Letters Patent, is—

1. In a fertilizer distributer, the combination of a frame mounted upon traveling or bearing wheels, a shaft journaled in said frame, said shaft provided with gear wheels located at the ends of the shaft, parallel shafts located at substantially right angles to the shaft provided with the gear wheels at its end, gear wheels fixed to said parallel shafts and adapted to mesh with the aforesaid gear wheels, said parallel shafts provided with sprocket wheels, one fixed and one fixedly mounted and one loosely mounted upon each of the parallel shafts, distributing chains mounted upon said tight and loosely mounted sprocket wheels and a feed plate adapted to constitute the bottom of the hopper, said feed plate provided with discharge openings and the members of the distributing chains located above and below the bottom of the hopper, and cut off plates adapted to close the discharge openings in the feed plate, substantially as and for the purpose specified.

2. In a fertilizer distributer the combination of a traveling frame mounted upon bearing wheels, a hopper mounted upon said frame, a shaft journaled in said frame, said shaft provided with gear wheels located at the ends of said shaft, parallel shafts located at substantially right angles to the shaft provided with the gear wheels at its ends, gear wheels fixed to said parallel shafts and adapted to mesh with the aforesaid gear wheels, said parallel shafts each provided with two sprocket wheels, one on each of said parallel shafts fixedly and loosely mounted, distributing chains mounted upon said fixed and loose sprocket wheels, said distributing chains located upon the bottom of the hopper and the lower members below the bottom of said hopper, a feed plate adapted to constitute the bottom of the hopper and provided with staggered discharge openings and means regulating the discharge of the fertilizing material, substantially as and for the purpose specified.

3. In a fertilizer distributer, the combination of a traveling frame mounted upon bearing wheels, a hopper carried by said frame, a feed plate adapted to constitute the bottom of said hopper, distributing chains adapted to move in opposite directions, the upper members of said distributing chains located upon the bottom of the hopper and the lower members below the bottom of the hopper, said feed plate provided with staggered openings and means for actuating said distributing chains in opposite directions, substantially as and for the purpose specified.

4. In a fertilizer distributer, the combination of a traveling frame mounted upon traveling wheels, a hopper carried by said frame, the bottom of said hopper provided with staggered discharge openings, two parallel shafts each provided with a tight and loose sprocket wheel, distributing chains mounted upon said tight and loose sprocket wheels, the upper member of each distributing chain located above the bottom of the hopper and the lower members of each distributing chain located below the bottom of the hopper, means for adjusting the size of the discharge openings and means for actuating the distributing chains, substantially as and for the purpose specified.

5. In a fertilizer distributer, a traveling frame mounted upon bearing wheels, a hopper carried by said frame, a feed plate adapted to constitute the bottom of the hopper and provided with staggered openings, distributing chains adapted to pass over said hopper bottom, means for closing said openings consisting of a centrally located fixed bar, a sliding plate adapted to close said staggered openings, and links pivotally connected to said fixed bar and sliding plates, one of said links being elongated to form an operating lever, substantially as and for the purpose specified.

6. In a fertilizer distributer, a traveling frame mounted upon bearing wheels, a hopper carried by said frame, the bottom of said hopper provided with staggered openings, distributing chains adapted to pass over said hopper bottom, sliding plates adapted to close the openings in the hopper bottom, means for sliding each of the plates, and means for actuating the distributing chains, substantially as and for the purpose specified.

7. In a fertilizer distributer, a traveling frame mounted upon bearing wheels, a hopper carried by said frame, the bottom of said hopper provided with staggered openings, distributing chains adapted to pass over said hopper bottom, sliding plates adapted to close the openings in the hopper bottom, means for sliding each of the plates, and means for actuating the distributing chains in opposite directions, substantially as and for the purpose specified.

In testimony that I claim the above, I have hereunto subscribed my name in the presence of two witnesses.

CHRISTIAN RUOF.

Witnesses:
SYLVIA BORON,
F. W. BOND.